United States Patent
Fisher

(10) Patent No.: US 6,503,378 B1
(45) Date of Patent: Jan. 7, 2003

(54) POLYMER ELECTROLYTE MEMBRANE AND METHOD OF FABRICATION

(75) Inventor: Allison M. Fisher, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 66 days.

(21) Appl. No.: 09/797,557

(22) Filed: Apr. 23, 2001

(51) Int. Cl.[7] .............................................. C25B 13/00
(52) U.S. Cl. ............................ 204/296; 429/33; 429/30
(58) Field of Search ........................... 204/296; 429/30, 429/33

(56) References Cited

U.S. PATENT DOCUMENTS 6,294,614 B1 * 9/2001 Kataoka et al. ............. 525/242

* cited by examiner

*Primary Examiner*—Bruce F. Bell
(74) *Attorney, Agent, or Firm*—William E. Koch

(57) ABSTRACT

A polymer electrolyte membrane comprised of a hydrophobic hydrocarbon region, a hydrophilic region containing covalently bound acid functional groups and protic functional groups. The hydrophobic hydrocarbon region and the hydrophilic region are covalently bound to form a single polymer molecule.

10 Claims, 2 Drawing Sheets

POLYMER ELECTROLYTE MEMBRANE AND METHOD OF FABRICATION

FIELD OF THE INVENTION

This invention relates to a polymer electrolyte membrane, and more specifically to a membrane for use in polymer electrolyte fuel cells and related applications.

BACKGROUND OF THE INVENTION

Fuel cell technology provides for the combining of hydrogen protons with oxygen from air or as a pure gas. The process is accomplished utilizing a proton exchange membrane (PEM) sandwiched between two electrodes, namely an anode and a cathode. Membrane materials typically used for polymer electrolyte membrane fuel cells (PEMFCs) are Nafion® perfluorinated sulfonic acid polymers. Perfluorinated sulfonic acid polymers are believed to undergo microphase separation, which means that the hydrophilic sulfonic acid groups associate into separate regions from the perfluorocarbon polymer backbone. The backbone region is hydrophobic, and is not physically cross-linked, which means that chain mobility is not restricted severely. When the membrane is hydrated, water molecules enter the hydrophilic regions, increasing their size and shape, as well as membrane ionic conductivity. The effect of these dynamic results is a fairly narrow operating window for maximum fuel cell performance. At low levels of hydration, that is, low humidity and temperatures over 80° C., the proton conductivity of Nafion® drops significantly. Other problems with Nafion® membranes are high cost, high osmotic drag of water, and high methanol permeability.

One of Nafion's strengths as a fuel cell membrane is that it forms a microphase separated architecture upon film formation. Specifically, the film is composed of hydrophilic (water-loving) ionic "clusters" or "channels" dispersed in a hydrophobic matrix. At the same time, because of the lack of covalent cross-linking, the optimal structure for best performance can not be fixed, that is, the proton conductivity, channel size, and degree of hydration are dynamic and change with operating conditions. Another problem with Nafion® membranes is that protons need water or other similar functional groups in order to migrate through the membrane. There are no additional hydroxyl groups in Nafion® which can carry out this function. The ether oxygen atoms in the channels are flanked by strongly electron withdrawing $CF_2$ groups, which render the lone pairs of electrons on the ether oxygen much less capable of sharing with a traveling proton.

In general, current approaches to new membrane materials are to add sulfonic acid groups to pre-formed aromatic polymers. There are some problems with this approach. First, the acidity of these sulfonic acid groups is usually much less than the fluorosulfonic acid groups in Nafion®, making it more difficult to achieve comparable proton conductivities without resorting to extremely high degrees of sulfonation, which can lead to mechanical and solubility problems with the film. Second, there is no guarantee that sulfonation will result in a channel structure in a film. Highly aromatic, rigid polymers such as polyimides, and polybenzamidazoles, etc., for steric reasons may not be able to adopt the necessary configurations for good proton mobility through the film. Third, water is still necessary for proton transfer in these films, as there tends to be no other functional groups present which can hydrogen-bond with the proton and facilitate its transport.

It would be highly advantageous, therefore, to remedy the foregoing and other deficiencies inherent in the prior art. New block copolymers proposed herein would provide for an improved membrane material for use in fuel cell devices, and in particular in polymer electrolyte membrane fuel cells. Accordingly, it is an object of the present invention to provide a new and improved polymer electrolyte membrane characterized by a three-dimensional structure with pores aligned and functionalized for the efficient transport of protons without the need for significant additional hydration.

It is another purpose of the present invention to provide for a new and improved polymer electrolyte membrane in which methanol permeability is reduced.

It is yet another purpose of the present invention to provide for a new and improved polymer electrolyte membrane with improved thermal and mechanical stability.

It is still another purpose of the present invention to provide for a new and improved polymer electrolyte membrane for use in fuel cell applications that require higher methanol concentrations, thereby providing for improved fuel utilization, enhanced cathode catalytic activity, and reduced system complexity for water recovery.

SUMMARY OF THE INVENTION

Briefly, to achieve the desired objects of the instant invention in accordance with a preferred embodiment thereof, provided is a polymer electrolyte membrane and a method of fabrication comprised of a hydrophobic hydrocarbon region, a hydrophilic region containing covalently bound acid functional groups and protic functional groups. The hydrophobic hydrocarbon region and the hydrophilic region are covalently bound to form a single polymer molecule.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawing, in which.

DETAILED DESCRIPTION OF THE PREFERRED EMBODIMENT

Recent developments in living polymerization processes, specifically quasiliving or controlled radical polymerization (CRP), have made it possible to improve fuel cell membranes in terms of formation of the fuel cell. In particular, membranes formed of block copolymers provide for a microphase separation upon film formation. Control of the resulting morphology will be achieved by optimizing the molecular structure of each block, the relative lengths of each block, and if necessary, through additional processing such as forming the film on a patterned self-assembled monolayer coated surface. By synthesizing the block copolymers using "controlled" radical polymerization processes, the size of each block can be varied, and each will be of narrow polydispersity. In addition, these radical polymerization processes are tolerant of a wide variety of functional groups. Consequently, molecular structure, density of hydrophilic functional groups, polymer Tg, and mechanical properties, can be defined specifically. A more detailed description of the proposed chemistry of the polymer electrolyte membrane follows, beginning with a description of the quasiliving radical polymerization process.

Block copolymers are increasingly important materials because of the properties which result from their unique molecular structure. These materials combine the inherent properties of the parent homopolymers along with the additional benefit of new properties appearing in relation to the phase morphology. Block copolymers with narrow polydispersity are known to undergo microphase separation as a result of the immiscibility of the two blocks. Bulk physical separation is prevented because the blocks are linked covalently. The resulting morphologies are determined by the relative lengths of the two blocks, molecular structure of each block, molecular weight, and the magnitude of the repulsive interactions between the chemically dissimilar blocks. Among the most observed morphologies are lamellae and cylindrical, which can be oriented either parallel to or perpendicular to the supporting surface, and spherical. Several techniques, including self-assembly, have been reported recently for fabricating films or asymmetric block copolymers with a good deal of control over film morphology and orientation.

Figure 1:
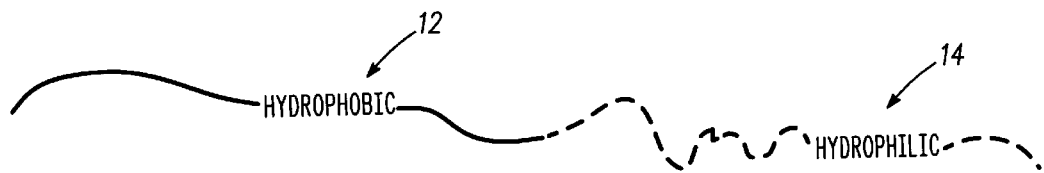
FIG. 1 illustrates the general structure of an asymmetric diblock copolymer in accordance with the present invention.

Referring now to FIG. 1, illustrated is a general structure of an asymmetric diblock copolymer 10 composed of a hydrophobic A block (solid line) 12 and a hydrophilic B block (dashed line) 14. It is proposed to prepare a series of asymmetric block copolymers, A-B, in which the A blocks are hydrocarbon and may contain some level of a functional group that will undergo photochemical cross-linking in a subsequent step, and a hydrophilic B block containing fluorosulfonic acid groups and protic functional groups such as hydroxyl or amine. These new block copolymers undergo microphase separation upon film formation. More particularly, hydrophobic block 12 is formed as a hydrocarbon region. Hydrophilic block 14 includes covalently bound acid functional groups and protic functional groups. The hydrophobic hydrocarbon region 12 and hydrophilic region 14 are covalently bound to form a single polymer molecule, and more particularly a block copolymer.

As previously stated, control of the resulting morphology will be achieved by optimizing the molecular structure of each block, the relative lengths of each block, and if necessary, through additional processing such as forming the film on a patterned self-assembled monolayer coated surface. By synthesizing the block copolymers using "controlled" radical polymerization processes, the size of each block can be varied, and each will be a narrow polydispersity. In addition, these radical polymerization processes are tolerant of a wide variety of functional groups. After processing the film to achieve optimal microphase separation, the 3D structure may be fixed by photochemical cross-linking within the A blocks.

The most versatile quasiliving radical polymerization system is the atom transfer radical polymerization process (ATRP). Using ATRP, it is possible to polymerize a wide variety of monomers, even in the presence of trace impurities, and generate a diverse set of macromolecular architectures. ATRP employs the reversible activation and deactivation of the initiator, typically chosen from the group including benzyl chlorides and halogenated esters, such as ethyl 2 bromo isobutyrates, by transition metal catalysts to form radicals which can propagate by addition of monomer.

Figure 2:
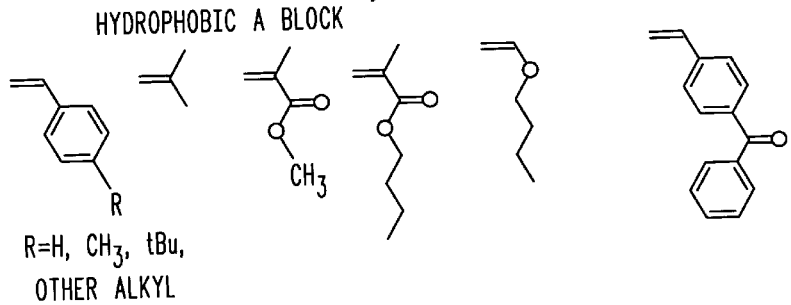
FIG. 2 illustrates potential monomers for the preparation of block copolymers in accordance with the present invention.
Figure 2:
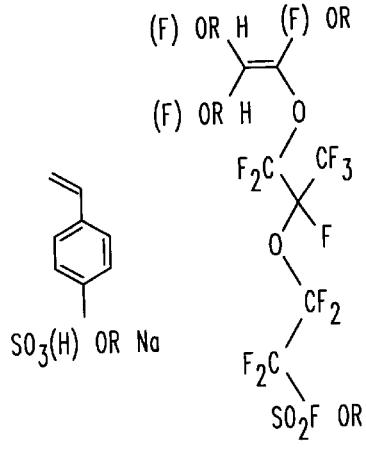
Figure 2:
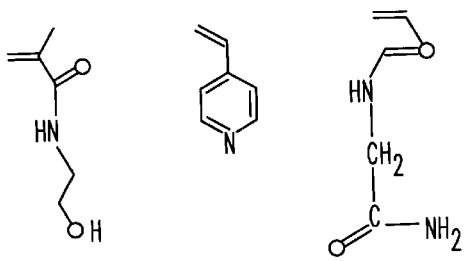

The molecular weight, or degree of polymerization, of the resulting polymer is defined by the ratio of the concentration of reacted monomer to that of the introduced initiator: $DP_n=\Delta[M]/[I]_o$, and values between 200–200,000 are typical. Polydispersities are very low, usually between 1.04–1.5, and on average closer to the lower end of the range. Herein is described a method for preparing a series of diblock copolymers for polymer electrolyte membrane fuel cell (PEMFC)/direct methanol fuel cell (DMFC) applications using monomers 20 such as those illustrated in FIG. 2. More specifically, illustrated are a hydrophobic 'A'block 22, and a hydrophilic 'B'block 24. As illustrated, hydrophobic blocks 22 will be constructed using monomers known to undergo radical polymerization, such as any combination of the following monomers: styrene, 4-alkylstyrene, isoprene, acrylates, acrylamides, methacrylates, vinyl aromatic monomers, and vinyl ether monomers. Cross-linking is optional and can be accomplished in a subsequent step by photochemical irradiation. The optimal level of cross-linking will be determined through experimentation. Hydrophilic blocks 24 will be prepared using a combination of-functionalized monomers such as those chosen from a group including: hydroxylated acrylamides and acrylates, acrylonitrile, vinylamines such as 4-vinyl pyridine, monomers possessing one or more sulfonic acid groups such as 4-vinylbenzene sulfonic acid, and sulfonyl fluoride substituted monomers capable of undergoing CRP. It is anticipated by this disclosure that other protic functional groups can be incorporated in hydrophilic block 24.

Figure 3:
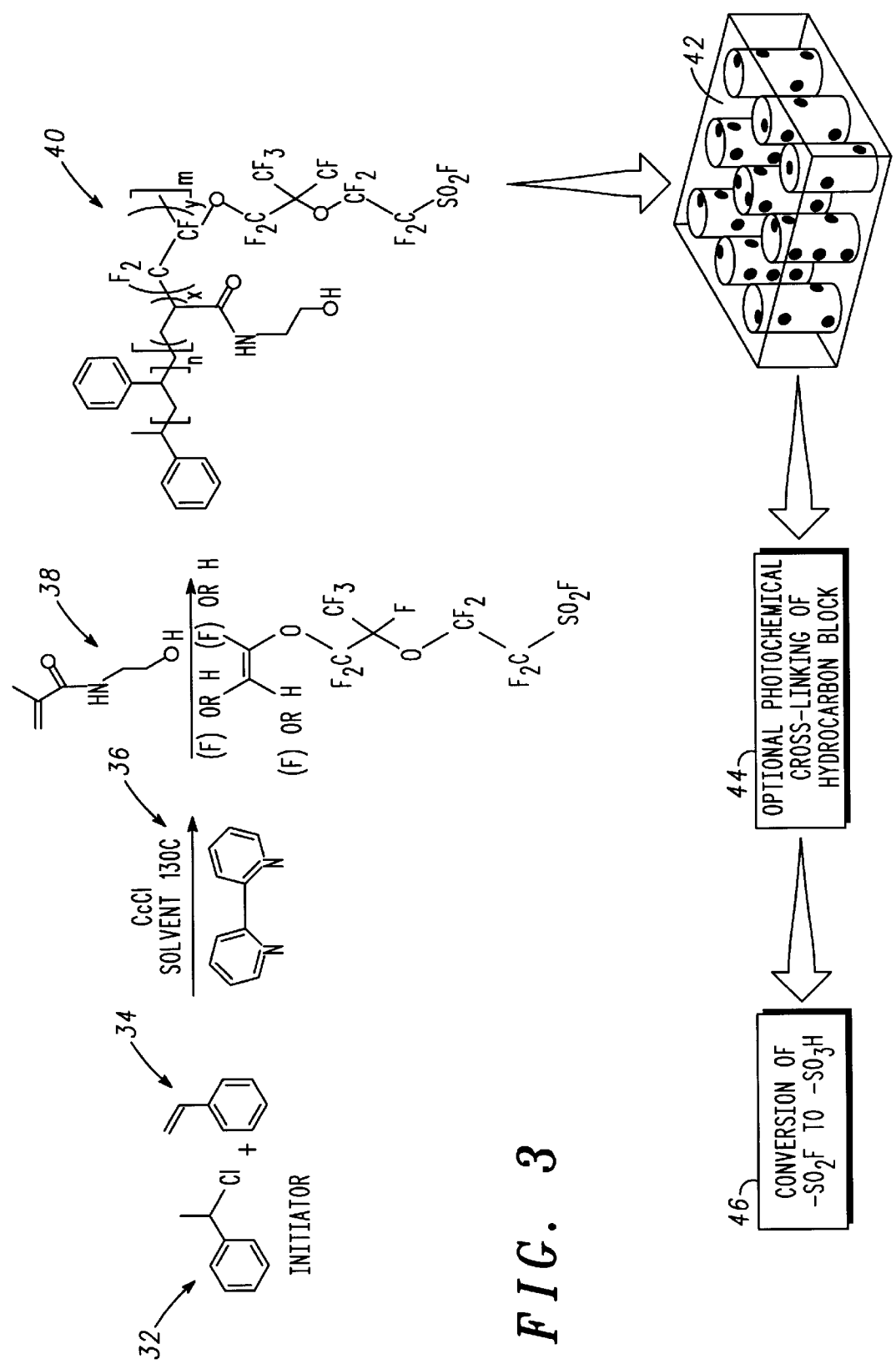
FIG. 3 illustrates a method of fabricating a novel polymer electrolyte membrane in accordance with the present invention.

Referring now to FIG. 3, illustrated is the chemistry proposed to prepare novel block copolymers for the polymer electrolyte membrane according to the present invention. In addition to the need to determine the optimal level of crosslinking (ratio of n/m), it will be necessary to investigate the optimal loading of sulfonic acid groups (ratio of x/y) and finally, optimal size of B block relative to A block ([(n/m)/(x/y)]; i.e., the density and morphology of nanochannels).

Using the chemistry proposed herein, it will be possible to not only incorporate the now assumed best functional group for good proton mobility in the hydrophilic blocks, hydroxyl group, but additionally other functional groups in the hydrophilic block and make a direct comparison of resulting proton conductivity. Other functional groups that would be good candidates to compare with the hydroxyl group include the: carboxylic amide, carboxylic acid, β-diketone, phenol, phosphoric acid, and amine. These alternative functional groups will be incorporated into the hydrophilic block during radical polymerization by using the appropriately functionalized vinyl, styryl, acrylate, or acrylamidyl monomers in place of the poly-hydroxyl monomers.

Illustrated in FIG. 3, is the method 30 according to this disclosure for the processing of the polymer to form a membrane for fuel cell applications according to the present invention. As illustrated, a first step in the method 30 includes providing for a initiator molecule 32 and an unfunctionalized hydrophobic monomer 34. A reagent 36 is provided, generally composed of a transition metal compound, solvent, or other similar material which provides for a reaction to proceed. Subsequent to the reaction 36, a functionalized monomer is formed 38, and then a block copolymer 40. As illustrated, the new block copolymer 40 will be cast into films 42 using standard procedures such as solution casting, dip- or spin-coating. Mechanical, thermal, and structural properties of the as-deposited film will be determined, and if needed, film microstructure will be optimized by annealing at temperatures near the Tg of the film, altering polymer microstructure, changing the ratio of n/m, or by some other processing technique. Once the desired film morphology is attained the film can be photochemically crosslinked 44. Cross-linking should lock the 3D structure and provide increased mechanical, chemical and thermal stability. In the final step, the film will be made proton-conductive by conversion 46 of the sulfonyl fluoride functional groups to sulfonic acid functional groups, using methods developed for the preparation of Nafion® films. Films of a variety of thicknesses are anticipated by this disclosure.

Ideally, membranes for PEMFCs include low cost materials, have high mechanical, thermal, and chemical stability, and good conductivity over a broad temperature range (−40° C. to 150° C.) and in low humidity environments. With respect to DMFCs, the membrane should additionally be impermeable to methanol, and demonstrate low levels of electro-osmotic drag of water. Accordingly, as disclosed herein a polymer electrolyte membrane is disclosed providing for use of a higher methanol concentration, reduction of complexity in an associated water recovery system, enhanced cathode catalytic activity and improved fuel utilization. The overall outcome is a fuel cell with significantly improved performance.

By now it should be appreciated that a novel polymer electrolyte membrane and method for making the membrane have been provided. A polymer electrolyte membrane is disclosed which provides for improved thermal, chemical and mechanical properties for applications in PEMFCs and other related applications such as electrochemical processes, electrochemical sensors, electro-chromic devices, batteries, supercapacitors, and the like.

The various steps of the method disclosed have been performed in a specific order for purposes of explanation, however, it should be understood that various steps of the disclosed method may be interchanged and/or combined with other steps in specific applications and it is fully intended that all such changes in the disclosed methods come within the scope of the claims.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A polymer electrolyte membrane comprising:
   a hydrophobic hydrocarbon region;
   a hydrophilic region containing covalently bound acid functional groups and protic functional groups;
   wherein the hydrophobic hydrocarbon region and the hydrophilic region are covalently bound to form a single polymer molecule.

2. The polymer electrolyte membrane of claim 1 wherein the hydrophobic hydrocarbon region is cross-linked.

3. The polymer electrolyte membrane of claim 1 wherein the hydrophilic region is cross-linked.

4. The polymer electrolyte membrane of claim 1 wherein the single polymer molecule is a block copolymer.

5. The polymer electrolyte membrane of claim 1 wherein the single polymer molecule is an interpenetrating polymer network.

6. The polymer electrolyte membrane of claim 1 wherein the hydrophobic hydrocarbon region includes at least one of a styrene, a 4-alkylstyrene, an isoprene, an acrylate, an acrylamide, a methacrylate, a vinyl aromatic monomer, or a vinyl ether monomer.

7. The polymer electrolyte membrane of claim 1 the hydrophilic region containing covalently bound acid functional groups and protic functional groups including at least one of a hydroxylated acylamide, an acrylate, an acrylonitrile, a vinylamine, a monomer possessing at least one sulfonic acid group, or a sulfonyl fluoride subbtiluled monomer.

8. A polymer electrolyte membrane comprising:
   a cross-linked hydrophobic hydrocarbon region;
   a cross-linked hydrophilic region containing covalently bound acid functional groups and protic functional groups;
   wherein the hydrophobic hydrocarbon region and the hydrophilic region are covalently bound to form a block copolymer.

9. The polymer electrolyte membrane of claim 8 wherein the hydrophobic hydrocarbon region includes at least one of a styrene, a 4-alkylstyrene, an isoprene, an acrylate, an acrylamide, a methacrylate, a vinyl aromatic monomer, or a vinyl ether monomer.

10. The polymer electrolyte membrane of claim 8 the hydrophilic region containing covalently bound acid functional groups and protic functional groups including at least one of a hydroxylated actylamide, an acryiates, an aciylonitrile, a vinylamine, a monomer possessing at least one sulfonic acid group, or a sulfonyl fluoride substituted monomer.

* * * * *